United States Patent
Sakagami et al.

(10) Patent No.: US 10,689,288 B2
(45) Date of Patent: Jun. 23, 2020

(54) ULTRAVIOLET TRANSMITTING GLASS (71) Applicant: AGC Inc., Chiyoda-ku, Tokyo (JP)

(72) Inventors: Takahiro Sakagami, Haibara-gun (JP); Makoto Shiratori, Haibara-gun (JP)

(73) Assignee: AGC Inc., Tokyo (JP)

(*) Notice: Subject to any disclaimer, the term of this patent is extended or adjusted under 35 U.S.C. 154(b) by 47 days.

(21) Appl. No.: 15/803,907

(22) Filed: Nov. 6, 2017

(65) Prior Publication Data
US 2018/0057393 A1 Mar. 1, 2018

Related U.S. Application Data (63) Continuation of application No. PCT/JP2016/065617, filed on May 26, 2016.

(30) Foreign Application Priority Data

| May 29, 2015 | (JP) | 2015-109626 |
| Aug. 7, 2015 | (JP) | 2015-156903 |
| Dec. 28, 2015 | (JP) | 2015-255893 |

(51) Int. Cl.
| C03C 3/093 | (2006.01) |
| C03C 4/00 | (2006.01) |
| C03C 3/089 | (2006.01) |
| C03C 3/091 | (2006.01) |
| C03C 3/097 | (2006.01) |
| G02F 1/01 | (2006.01) |

(52) U.S. Cl.
CPC ............ C03C 3/093 (2013.01); C03C 3/089 (2013.01); C03C 3/091 (2013.01); C03C 3/097 (2013.01); C03C 4/0085 (2013.01); G02F 1/011 (2013.01); G02F 2001/0113 (2013.01)

(58) Field of Classification Search
CPC ......... C03C 3/089; C03C 3/091; C03C 3/093; C03C 3/097; C03C 4/0085
See application file for complete search history.

(56) References Cited

U.S. PATENT DOCUMENTS

| 1,830,902 A | * | 11/1931 | Hood | ............... C03C 3/085 |
| | | | | 501/31 |
| 2009/0009691 A1 | | 1/2009 | Shiratori et al. | |
| 2018/0215652 A1 | * | 8/2018 | Sakagami | ............... C03C 3/093 |

FOREIGN PATENT DOCUMENTS

| CN | 1833306 | | 9/2006 | |
| CN | 101146748 | | 3/2008 | |
| EP | 1 653 499 A1 | | 5/2006 | |
| JP | 30-003939 | | 6/1955 | |
| JP | 45-017795 | | 6/1970 | |
| JP | 60-046946 | | 3/1985 | |
| JP | 60-077144 | | 5/1985 | |
| JP | 62-027346 | | 2/1987 | |
| JP | 07-187706 | | 7/1995 | |
| JP | 07-202208 | | 8/1995 | |
| JP | 10036134 A | * | 2/1998 | ............ C03C 3/093 |
| JP | 2002-114536 | | 4/2002 | |
| JP | 2004091308 A | * | 3/2004 | ............ C03C 3/091 |
| JP | 2006-089342 | | 4/2006 | |
| JP | 2007-137705 | | 6/2007 | |
| JP | 2015-508385 | | 3/2015 | |
| JP | 2015-074589 | | 4/2015 | |

OTHER PUBLICATIONS

Machine Translation of JP 2015-074589A. Apr. 20, 2015. (Year: 2015).*
International Search Report dated Aug. 30, 2016 in PCT/JP2016/065617 filed May 26, 2016 (with English Translation).
Written Opinion dated Aug. 30, 2016 in PCT/JP2016/065617 filed May 26, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

An ultraviolet transmitting glass containing, in mole percentage based on oxides, 55 to 80% of $SiO_2$, 12 to 27% of $B_2O_3$, 4 to 20% of $R_2O$ (where R represents an alkali metal selected from a group consisting of Li, Na, and K) in total, 0 to 3.5% of $Al_2O_3$, 0 to 5% of R'O (where R' represents an alkaline earth metal selected from a group consisting of Mg, Ca, Sr, and Ba) in total, 0 to 5% of ZnO, and 0 to 10% of $ZrO_2$, wherein transmittance at a wavelength of 254 nm in terms of spectral transmittance at a plate thickness of 0.5 mm is 70% or more. The glass with high ultraviolet light transmittance, in particular, high deep ultraviolet light transmittance is provided.

18 Claims, 1 Drawing Sheet

ULTRAVIOLET TRANSMITTING GLASS

CROSS-REFERENCE TO RELATED APPLICATIONS

This application is a continuation of prior International Application No. PCT/JP2016/065617, filed on May 26, 2016 which is based upon and claims the benefit of priority from Japanese Patent Applications No. 2015-109626, filed on May 29, 2015, No. 2015-156903, filed on Aug. 7, 2015 and No. 2015-255893, filed on Dec. 28, 2015; the entire contents of all of which are incorporated herein by reference.

FIELD

The present invention relates to an ultraviolet transmitting glass having high transmittance of light with a wavelength in an ultraviolet region.

BACKGROUND

There has been conventionally known a low-pressure mercury lamp and a high-pressure mercury lamp as an ultraviolet light-emitting light source. In recent years, a small-sized and low-cost ultraviolet LED (an ultraviolet light-emitting diode) has been widely used, and it has been used for various usages such as a water sterilizer, a curing apparatus of an ultraviolet curable resin, and an ultraviolet sensor.

Conventionally, there is a quartz glass capable of efficiently transmitting ultraviolet light as a glass used for an apparatus including such an ultraviolet light source. However, there is a problem that a manufacturing cost of the quartz glass is expensive. On the other hand, there are known a phosphate glass and a borosilicate glass as a glass capable of efficiently transmitting ultraviolet light in addition to the quartz glass (for example, refer to Patent References 1(JP-A S62-027346) and 2(JP-A S60-046946)). However, these glasses have low transmittance of light with a wavelength of 400 nm or less, particularly light with wavelengths from 200 to 280 nm (hereinafter, it is also referred to as deep ultraviolet light), and improvement in the transmittance has been desired.

SUMMARY

An object of the present invention is to provide a glass having high ultraviolet light transmittance, in particular, high deep ultraviolet light transmittance.

As a result of earnest study, the present inventors have found that a glass having high deep ultraviolet light transmittance can be obtained by setting a glass composition in a specific range.

That is, an ultraviolet transmitting glass (hereinafter may refer to it as the first ultraviolet transmitting glass of the present invention) of the present invention contains, in mole percentage based on oxides, 55 to 80% of $SiO_2$, 12 to 27% of $B_2O_3$, 4 to 20% of $R_2O$ (where R represents at least one kind of an alkali metal selected from a group consisting of Li, Na, and K) in total, 0 to 3.5% of $Al_2O_3$, 0 to 5% of R'O (where R' represents at least one kind of an alkaline earth metal selected from a group consisting of Mg, Ca, Sr, and Ba) in total, 0 to 5% of ZnO, and 0 to 10% of $ZrO_2$, and transmittance at a wavelength of 254 nm in terms of spectral transmittance at a plate thickness of 0.5 mm is 70% or more.

Besides, an ultraviolet transmitting glass (hereinafter may refer to it as the second ultraviolet transmitting glass of the present invention) of the present invention contains, in mole percentage based on oxides, 55 to 80% of $SiO_2$, 12 to 27% of $B_2O_3$, 4 to 20% of $R_2O$ (where R represents at least one kind of an alkali metal selected from a group consisting of Li, Na, and K) in total, 0 to 3.5% of $Al_2O_3$, 0 to 5% of R'O (where R' represents at least one kind of an alkaline earth metal selected from a group consisting of Mg, Ca, Sr, and Ba) in total, 0 to 5% of ZnO, and 0 to 5% of $Ta_2O_5$, and transmittance at a wavelength of 254 nm in terms of spectral transmittance at a plate thickness of 0.5 mm is 70% or more.

In the present description, the glass or the ultraviolet transmitting glass of the present invention includes the first ultraviolet transmitting glass and the second ultraviolet transmitting glass of the present invention unless otherwise specified.

The ultraviolet transmitting glass of the present invention preferably contains 0.01 to 2% of $Ta_2O_5$.

Besides, the ultraviolet transmitting glass of the present invention preferably does not substantially contain $Al_2O_3$.

Besides, the ultraviolet transmitting glass of the present invention preferably does not substantially contain R'O (where R' represents an alkaline earth metal selected from a group consisting of Mg, Ca, Sr, and Ba).

Besides, the ultraviolet transmitting glass of the present invention may further contain 0.00005 to 0.01% of $Fe_2O_3$ and/or 0.0001 to 0.02% of $TiO_2$.

Besides, the ultraviolet transmitting glass of the present invention preferably substantially contains none of $Cr_2O_3$, NiO, CuO, $CeO_2$, $V_2O_5$, $WO_3$, $MoO_3$, $MnO_2$, and CoO.

Besides, the ultraviolet transmitting glass of the present invention preferably does not substantially contain Cl.

Besides, the ultraviolet transmitting glass of the present invention preferably has average reflectance of a surface lower than average reflectance of an inside for 3% or more in terms of average reflectance of light with wavelengths from 250 to 1200 nm.

Besides, the ultraviolet transmitting glass of the present invention preferably has a $SiO_2$ content of a surface higher than that of an inside, and a $B_2O_3$ content of the surface lower than that of the inside.

Besides, a degree of deterioration of transmittance at the wavelength of 254 nm of the ultraviolet transmitting glass of the present invention which is found by the following expression is preferably 10% or less in an ultraviolet irradiation test.

$$\text{Degree of deterioration (\%)} = [(T0-T1)/T0] \times 100$$

In the expression, T0 is initial transmittance at the wavelength of 254 nm of a glass substrate with a plate thickness of 0.5 mm whose both surfaces are optically polished, and T1 is transmittance at the wavelength of 254 nm after ultraviolet light with the wavelength of 254 nm is irradiated on the glass substrate at an intensity of 5 mW/cm$^2$ for 100 hours.

Besides, in the ultraviolet transmitting glass of the present invention, transmittance at a wavelength of 365 nm is preferably 80% or more in terms of spectral transmittance at a plate thickness of 0.5 mm.

Besides, the ultraviolet transmitting glass of the present invention preferably has an average thermal expansion coefficient in a temperature range of 0 to 300° C. of $30 \times 10^{-7}$/° C. to $90 \times 10^{-7}$/° C.

According to the present invention, it is possible to obtain a glass with high ultraviolet light transmittance, in particular, high deep ultraviolet light transmittance.

DETAILED DESCRIPTION

Hereinafter, embodiments of the present invention are described.

The first ultraviolet transmitting glass of the present invention contains, in mole percentage based on oxides, 55 to 80% of $SiO_2$, 12 to 27% of $B_2O_3$, 4 to 20% of $R_2O$ (where R represents at least one kind of an alkali metal selected from a group consisting of Li, Na, and K) in total, 0 to 3.5% of $Al_2O_3$, 0 to 5% of R'O (where R' represents at least one kind of an alkaline earth metal selected from a group consisting of Mg, Ca, Sr, and Ba) in total, 0 to 5% of ZnO, and 0 to 10% of $ZrO_2$.

Besides, the second ultraviolet transmitting glass of the present invention contains, in mole percentage based on oxides, 55 to 80% of $SiO_2$, 12 to 27% of $B_2O_3$, 4 to 20% of $R_2O$ in total, 0 to 3.5% of $Al_2O_3$, 0 to 5% of R'O in total, 0 to 5% of ZnO, and 0 to 5% of $Ta_2O_5$. Hereinafter, each component forming the ultraviolet transmitting glass of the present invention is described. In the following description of each component, "%" indicates "mol %" unless otherwise specified.

$SiO_2$ is a component forming a skeletal structure of glass and is essential. When a content is less than 55%, stability as the glass decreases, or weather resistance decreases. The content of $SiO_2$ is preferably 55.5% or more, and more preferably 56% or more. When the content of $SiO_2$ is over 80%, viscosity of the glass increases, and meltability extremely decreases. The content of $SiO_2$ is preferably 77% or less, and typically 75% or less.

$Al_2O_3$ is a component improving weather resistance of glass. When $Al_2O_3$ is contained, viscosity of the glass increases when a content is over 3.5%, and homogeneous melting becomes difficult. The content of $Al_2O_3$ is preferably 3.3% or less, and typically 3% or less. The most preferably, $Al_2O_3$ is not contained.

Reasons why $Al_2O_3$ is preferably not substantially contained in the present invention are described below. Deep ultraviolet light transmittance in glass depends on an amount of non-bridging oxygen of the glass, and it is thought that the deep ultraviolet light transmittance becomes lower when the non-bridging oxygen amount is large. $Al_2O_3$ is a component decreasing the non-bridging oxygen amount of the glass, and it has been conventionally thought that the glass having high deep ultraviolet light transmittance can be obtained by containing $Al_2O_3$. However, the present inventors conducted tests while changing glass composition conditions of $Al_2O_3$ and others. As a result, they found new knowledge that the glass having high deep ultraviolet light transmittance can be obtained by reducing the content of $Al_2O_3$ as much as possible or by preferably not containing $Al_2O_3$ which is contrary to conventional common general technical knowledge. A mechanism thereof has not been known in detail, but the following reasons can be considered.

It has been considered that $Al_2O_3$ forms a network structure of glass accompanied by an alkali metal component in the glass to thereby decrease non-bridging oxygen. However, fluctuation of a glass structure may occur due to an amorphous state of the glass. That is, the non-bridging oxygen amount has a tendency to averagely decrease by increasing the content of $Al_2O_3$. On the other hand, a possibility of increasing in a ratio where there exist Al components which do not form the network structure due to the fluctuation of the structure peculiar to the amorphous state, as modifier oxide (a structural defect) cannot be denied. The structural defect due to the Al components which do not form the network structure is considered to form an absorption band of light at an ultraviolet region, and thereby, ultraviolet transmitting ability is lowered. In the present invention, a state where a specific component is not substantially contained means that it is not intentionally added, and a content to a degree which is inevitably mixed from a raw material or the like and not impairing expected properties is not excluded.

$B_2O_3$ is a component improving deep ultraviolet light transmittance and is essential. A significant effect may not be obtained in improvement in the deep ultraviolet light transmittance when a content is less than 12%. The content of $B_2O_3$ is preferably 13% or more, and typically 14% or more. When the content of $B_2O_3$ is over 27%, striae due to volatilization occur, and yield is likely to be lowered. The content of $B_2O_3$ is preferably 26% or less, and typically 25% or less.

$R_2O$ (where R represents at least one kind of an alkali metal selected from a group consisting of Li, Na, and K) is a component improving meltability of glass and is essential. When $\Sigma R_2O$ (where $\Sigma R_2O$ is a total amount of contents of $Li_2O$, $Na_2O$ and $K_2O$) is less than 4%, the meltability becomes bad. $\Sigma R_2O$ is preferably 4.5% or more, and typically 5% or more. When $\Sigma R_2O$ is over 20%, weather resistance is lowered. $\Sigma R_2O$ is preferably 18% or less, and typically 16% or less.

R'O (where R' represents at least one kind of an alkaline earth metal selected from a group consisting of Mg, Ca, Sr, and Ba) is a component improving meltability, and is not essential but can be contained according to need. When R'O is contained, weather resistance is lowered if $\Sigma R'O$ (where $\Sigma R'O$ is a total amount of contents of MgO, CaO, SrO and BaO) is over 5%. A content of $\Sigma R'O$ is preferably 4% or less, and typically 3% or less. R'O contains relatively a lot of $Fe_2O_3$ and $TiO_2$ to be a cause of lowering of the deep ultraviolet light transmittance in a raw material, and therefore, it is preferably not substantially contained.

ZnO is a component improving weather resistance of glass and reducing a degree of deterioration in the ultraviolet irradiation test, and it can be contained according to need. When ZnO is contained, a devitrification property of glass gets worse if a content is over 5%. The content of ZnO is preferably 4.5% or less, and typically 4% or less.

$ZrO_2$ is a component improving weather resistance of glass and reducing a degree of deterioration in the ultraviolet irradiation test, and it is not essential but can be contained according to need. When $ZrO_2$ is contained, meltability of glass is likely to get worse if a content of $ZrO_2$ is over 10%. The content of $ZrO_2$ is preferably 9% or less, and typically 8% or less.

$Ta_2O_5$ is a component improving weather resistance of glass and reducing a degree of deterioration in the ultraviolet irradiation test, that is, suppressing coloring of glass due to ultraviolet light, and it is not essential but can be contained according to need. When $Ta_2O_5$ is contained, meltability is likely to get worse if a content of $Ta_2O_5$ is over 5%. Besides, an effect of suppressing the coloring of the glass due to ultraviolet light cannot be sufficiently obtained if the content is less than 0.01%. The content of $Ta_2O_5$ is preferably 0.01% or more, more preferably 0.03% or more, and particularly preferably 0.05% or more. Besides, when $Ta_2O_5$ is contained, the content is preferably 3% or less, and more preferably 2% or less.

It is also possible to contain $SnO_2$, $Sb_2O_5$, $Ag_2O$ or $Nb_2O_5$ in a range capable of obtaining the coloring suppression effect due to ultraviolet light and in a range capable of obtaining desired ultraviolet light transmittance, as components reducing the degree of deterioration in the ultraviolet irradiation test, that is, suppressing the coloring of the glass due to ultraviolet light such as $ZrO_2$ and $Ta_2O_5$. When these components are contained, any one kind may be contained, or a plurality of kinds may be contained.

$Fe_2O_3$ is a component absorbing deep ultraviolet light to lower the transmittance by existing in glass. However, it is extremely difficult to completely avoid mixing in of $Fe_2O_3$ from a glass raw material and manufacturing processes. Accordingly, $Fe_2O_3$ may be contained in a range of 0.00005 to 0.01%. When a content of $Fe_2O_3$ is less than 0.00005%, it is not preferable because a cost to manufacture the glass becomes high due to usage of refined high-cost glass raw materials, or the like. The content of $Fe_2O_3$ is typically 0.0001% or more. When the content of $Fe_2O_3$ is over 0.01%, it is not preferable because the deep ultraviolet light transmittance becomes too low. The content of $Fe_2O_3$ is preferably 0.0065% or less, and typically 0.005% or less.

$TiO_2$ is a component absorbing deep ultraviolet light to lower the transmittance by existing in glass as same as $Fe_2O_3$. However, it is extremely difficult to completely avoid mixing in of $TiO_2$ from a glass raw material and manufacturing processes. Accordingly, $TiO_2$ may be contained in a range of 0.0001 to 0.02%. When a content of $TiO_2$ is less than 0.0001%, it is not preferable because a cost to manufacture the glass becomes high due to usage of refined high-cost glass raw materials, or the like. A content of $TiO_2$ is typically 0.0003% or more. When the content of $TiO_2$ is over 0.02%, it is not preferable because the deep ultraviolet light transmittance becomes too low. The content of $TiO_2$ is preferably 0.015% or less, and typically 0.01% or less.

All of $Cr_2O_3$, NiO, CuO, $CeO_2$, $V_2O_5$, $WO_3$, $MoO_3$, $MnO_2$ and CoO are components absorbing deep ultraviolet light to lower the transmittance by existing in glass. Accordingly, these components are preferably not substantially contained in the glass.

Cl is preferably not substantially contained in glass because it may particularly increase a degree of deterioration at a wavelength of 365 nm in the later-described ultraviolet irradiation test.

The glass of the present invention may further contain a fluorine component and $SO_3$ in order to clarify the glass.

The ultraviolet transmitting glass of the present invention has the transmittance at a wavelength of 254 nm of 70% or more in terms of spectral transmittance at a plate thickness of 0.5 mm. The ultraviolet transmitting glass with optical characteristics as stated above is used for an apparatus which utilizes the deep ultraviolet light, and thereby, it becomes possible to efficiently operate the apparatus. When the transmittance at the wavelength of 254 nm is less than 70% in terms of the spectral transmittance at the plate thickness of 0.5 mm, it is not preferable because the apparatus cannot be efficiently operated. The transmittance at the wavelength of 254 nm is preferably 72% or more, more preferably 75% or more, and particularly preferably 80% or more.

The ultraviolet transmitting glass of the present invention may have the transmittance at the wavelength of 365 nm of 80% or more in terms of spectral transmittance at the plate thickness of 0.5 mm. The ultraviolet transmitting glass with optical characteristics as stated above is used for an apparatus which utilizes the ultraviolet light with the wavelength of 365 nm, and thereby, it is possible to efficiently operate the apparatus. When the transmittance at the wavelength of 365 nm in terms of spectral transmittance at the plate thickness of 0.5 mm is less than 80%, it is not preferable because the apparatus cannot be efficiently operated. The transmittance at the wavelength of 365 nm is preferably 82% or more, more preferably 85% or more, and particularly preferably 90% or more.

In the ultraviolet transmitting glass of the present invention, average reflectance of a surface is preferably 3% or more lower than average reflectance of an inside in terms of average reflectance of light with wavelengths from 250 to 1200 nm. In a glass composition, a refractive index of a glass surface tends to be lower compared to a refractive index of a glass inside because the glass surface is reformed by polishing or washing the glass when the $Al_2O_3$ content is small. The reflectance of the glass surface is thereby lowered compared to the reflectance of the glass inside (a part where the glass is not reformed), and as a result, the transmittance of light with the wavelengths from 250 to 1200 nm increases. The above-stated effect cannot be expected when a difference between the average reflectance of the glass surface and the average reflectance of the glass inside is less than 3%.

The ultraviolet transmitting glass of the present invention preferably has the $SiO_2$ content of the glass surface higher than that of the glass inside, and the $B_2O_3$ content of the glass surface lower than that of the glass inside. A refractive index of $SiO_2$ is lower than other glass components. It is therefore possible to lower the refractive index of the glass surface compared to the refractive index of the glass inside by increasing the $SiO_2$ content of the glass surface compared to that of the glass inside. Besides, $B_2O_3$ forms a ring structure in glass and sometimes exists as a cluster, so it is easy to be dropped away from the glass surface to contribute to increase the $SiO_2$ content of the glass surface. The glass as stated above enables to obtain the ultraviolet transmitting glass where the average reflectance of the glass surface is 3% or more lower than the average reflectance of the glass inside in terms of the average reflectance of light with the wavelengths from 250 to 1200 nm. Note that the glass inside means a center part of the glass in a light transmitting direction.

The ultraviolet transmitting glass of the present invention is preferably suppressed ultraviolet solarization (coloring of glass due to exposure to ultraviolet light). Specifically, a degree of deterioration of the transmittance at the wavelength of 254 nm is preferably 10% or less in the following ultraviolet irradiation test. In the ultraviolet irradiation test, a sample is prepared by cutting a glass sample into a 30 mm square plate shape, and performing optical polishing on both surfaces to a thickness of 0.5 mm, and ultraviolet light is irradiated on the sample under a condition with ultraviolet irradiation intensity at the wavelength of 254 nm of approximately 5 mW/cm$^2$ for 100 hours by using a physicochemical high-pressure mercury lamp. Subsequently, transmittance (T1) at the wavelength of 254 nm is measured, and the degree of deterioration can be found by the following expression as a decreasing rate from initial transmittance (T0) at the wavelength of 254 nm before the ultraviolet irradiation.

$$\text{Degree of deterioration } (\%) = [(T0-T1)/T0] \times 100$$

Besides, in the ultraviolet transmitting glass of the present invention, the degree of deterioration of transmittance at the wavelength of 365 nm when the ultraviolet light is irradiated under the same condition as the above-stated ultraviolet irradiation test is preferably 10% or less. Note that the degree of deterioration of the transmittance at the wavelength of 365 nm is a value found by the following expression.

Degree of deterioration (%)=[(T2−T3)/T2]×100

Here, T3 is transmittance at the wavelength of 365 nm after ultraviolet light is irradiated under a condition with ultraviolet irradiation intensity at the wavelength of 254 nm of approximately 5 mW/cm$^2$ for 100 hours by using a physicochemical high-pressure mercury lamp, and T2 is initial transmittance at the wavelength of 365 nm before the ultraviolet irradiation.

The ultraviolet transmitting glass of the present invention preferably has an average thermal expansion coefficient in a temperature range of 0 to 300° C. of 30×10$^{-7}$/° C. to 90×10$^{-7}$/° C. When the ultraviolet transmitting glass is used for, for example, an ultraviolet light source apparatus, the ultraviolet transmitting glass is adhered to a package material so as to hermetically seal a light source. The ultraviolet light source increases in temperature in accordance with light emission, and therefore, there is a fear that a hermetic state cannot be kept due to peeling and breakage when there is a large difference in thermal expansion coefficients between the ultraviolet transmitting glass and the package material. There are used package materials formed of materials such as glass, crystallized glass, ceramics, and alumina in consideration of heat resistance, and the ultraviolet transmitting glass preferably has the average thermal expansion coefficient in the temperature range of 0 to 300° C. of 30×10$^{-1}$/° C. to 90×10$^{-7}$/° C. so as to reduce the thermal expansion coefficient difference between these package materials and the ultraviolet transmitting glass. When the average thermal expansion coefficient of the ultraviolet transmitting glass is out of the above-stated range, the thermal expansion coefficient difference from the package material becomes large, and there is a fear as stated above when the ultraviolet light source apparatus is used.

Besides, a difference in average thermal expansion coefficients in the temperature range of 0 to 300° C. between the ultraviolet transmitting glass and a member which is joined to the ultraviolet transmitting glass is preferably 20×10$^{-7}$/° C. or less, more preferably 10×10$^{-7}$/° C. or less, and the most preferably 5×10$^{-7}$/° C. or less. In the present invention, the thermal expansion coefficient is measured by using a differential dilatometer. Heating is carried out at a heating rate of 10° C./min, and an average linear expansion coefficient at a temperature range of 0 to 300° C. is calculated.

The ultraviolet transmitting glass of the present invention preferably does not substantially have fluorescence (a fluorescence emission property). Glass which does not substantially have the fluorescence indicates glass having later-described fluorescence intensity (arbitrary unit) of not exceeding 3.5×10$^2$. That is, glass from which fluorescence is not completely emitted is the most preferable, but it is physically impossible to manufacture the glass from which fluorescence is not completely emitted. Accordingly, glass which emits slight fluorescence, but the fluorescence intensity (a maximum value (arbitrary unit) of the fluorescence intensity at wavelengths from 600 nm to 800 nm) does not exceed 3.5×10$^2$, having extremely low fluorescence intensity is called as the glass which does not substantially have the fluorescence.

In the present invention, the fluorescence intensity of the glass is measured by using the following apparatus. A microscopic Raman spectrometer is used, excitation light with a wavelength of 532 nm is irradiated on a glass plate (sample) with a width of 40 mm, a height of 40 mm, and a thickness of 0.5 mm, and fluorescence emitted from the sample is received by a spectroscope (manufactured by JASCO Corporation, FP-8500) through an optical filter which removes reflection of excitation light and scattered light, and thereby, it becomes possible to measure and evaluate weak fluorescence. The fluorescence intensity is obtained by evaluating obtained fluorescence data. The fluorescence emitted from the sample is the fluorescence emitted at a region up to a depth of about 20 µm where the excitation light with the wavelength of 532 nm enters from a glass surface. Note that the spectroscope is disposed in a direction perpendicular to the excitation light so as not to directly receive the excitation light which transmits through the sample.

The ultraviolet transmitting glass of the present invention preferably has the fluorescence intensity (the maximum value of the fluorescence intensity at the wavelengths from 600 nm to 800 nm, arbitrary unit) of 3.5×10$^2$ or less. For example, in fluorescence measurement using visible light as the excitation light in a cell observation, light-emission from the glass becomes small, and noises such as background light are suppressed by using the glass as stated above. Accordingly, observation is enabled without using a band pass filter or the like even when the fluorescence of cells is weak. The fluorescence intensity of the ultraviolet transmitting glass is more preferably 3×10$^2$ or less, and further preferably 2×10$^2$ or less.

Next, a manufacturing method of the ultraviolet transmitting glass of the present invention is described. First, glass raw materials to form each component of a desired composition are prepared. As the glass raw materials used in the present invention, there can be used compounds in any form such as oxide, hydroxide, carbonate, sulfate, nitrate, fluoride and chloride.

Next, these raw materials are mixed to be glass having the desired composition, and then input to a melting tank. The melting tank is a container made of a material selected from a platinum group metal, an alloy of the platinum group metals and a refractory. In the present invention, the container of the platinum group metal or the alloy of the platinum group metals is a container made of a metal or an alloy selected from a group consisting of platinum (Pt), iridium (Ir), palladium (Pd), rhodium (Rh), and an alloy of these, and the container can be used for high-temperature melting.

Babbles and striae are removed from the glass melted in the melting tank by using a deaeration tank and a stirring tank disposed on a downstream side, and thereby, homogenized and high-quality glass with little glass defect can be obtained. The above-stated glass can be slip cast into a mold by letting out through a nozzle or the like, or molded into a predetermined shape by rolling out and drawing out into a plate shape. Slicing, polishing, and so on are performed on slowly cooled glass, and thereby, a predetermined shaped glass is obtained.

The ultraviolet transmitting glass of the present invention can be suitably used for an apparatus using an ultraviolet light source (for example, a UV-LED, a UV laser, and so on), a support substrate for manufacturing a semiconductor wafer on the premise of performing UV peeling, an arc tube, and so on. As the above-stated apparatus, there can be cited, for example, a curing apparatus of an ultraviolet curable resin, a light source cover glass of an ultraviolet sensor, a water sterilizer, and so on, but it is not limited thereto. Besides, the ultraviolet transmitting glass of the present invention can be used in proper forms according to usages such as a tubular shape and a compact without being limited to the plate shape.

For example, in the UV-LED device, a UV-LED chip to be a light source is provided on a recessed part or a flat surface of a package formed of a base material such as a resin, a metal, ceramics, and they are electrically connected. A transparent material having a UV transmitting property is used as a light emission side window member, and it is constituted such that the light emission side window member and the base material are hermetically sealed. In the UV-LED device, heat generation occurs simultaneously with the UV light emission, and therefore, breakage and cracks are generated at a joint part between the base material and the transparent material when there is a large difference in thermal expansion coefficients between the base material and the transparent material to considerably lower product reliability. However, an ultraviolet high-transmitting glass of the present invention where the thermal expansion coefficient is controlled is used as the transparent material, and thereby, the thermal expansion coefficient difference from the base material can be improved. Further, fine weather resistance is also included, and therefore, it is possible to provide the UV-LED device with fewer occurrences of breakage and cracks of a product without lowering transmittance of a visible region even after it is used for a long time.

For example, in the UV sensor, a light sensor chip with sensitivity for a UV wavelength is provided on a recessed part or a flat surface of a package formed of a base material such as a resin, a metal, ceramics, and they are electrically connected. A transparent material having a UV transmitting property is used as a light incidence side window member, and it is constituted such that the light incidence side window member and the base material are hermetically sealed. Here, when there is a large difference in the thermal expansion coefficients between the base material and the transparent material, breakage and cracks are generated at each member to considerably lower product reliability. However, the ultraviolet high-transmitting glass of the present invention where the thermal expansion coefficient is controlled is used as the transparent material, and thereby, the thermal expansion coefficient difference from the base material can be improved. Further, fine weather resistance is also included, and therefore, it is possible to provide the UV sensor with fewer occurrences of breakage and cracks of a product without lowering transmittance of a visible region even after it is used for a long time.

For example, in the UV laser device, a UV laser to be a light source is provided on a recessed part or a flat surface of a package formed of a base material such as a metal and ceramics such as AlN, and they are electrically connected. A transparent material having a UV transmitting property is used as a light emission side window member, and it is constituted such that the light emission side window member and the base material are hermetically sealed. In the UV laser device, heat generation occurs simultaneously with the UV light emission, and therefore, breakage and cracks are generated at a joint part between the base material and the transparent material when there is a large difference in thermal expansion coefficients between the base material and the transparent material to considerably lower product reliability. However, the ultraviolet high-transmitting glass of the present invention where the thermal expansion coefficient is controlled is used as the transparent material, and thereby, the thermal expansion coefficient difference from the base material can be improved. Further, fine weather resistance is also included, and therefore, it is possible to provide the UV laser device with fewer occurrences of breakage and cracks of a product without lowering transmittance of a visible region even after it is used for a long time.

For example, there is used a light source where a substrate having UV-LEDs arranged linearly is sealed in a glass tube with a UV transmitting property for water sterilization. Here, the glass of the present invention formed into a tubular shape is used as the glass tube, and thereby, it is possible to provide the tubular UV-LED light source with high sterilizing property having high deep ultraviolet light transmittance. Note that the light source for the water sterilization is used under a state being immersed in water or in contact with water, and therefore, a temperature difference between an inner surface of the tube which is heated by heat generated from the light source and an outer surface of the tube which is in contact with water sometimes becomes large. It is therefore desirable that the glass forming the tube has low thermal expansion coefficient from a viewpoint of preventing breakage of the glass tube due to heat shock, and the glass of the present invention is suitable also in terms of this point. When the glass of the present invention is used for this usage, the average thermal expansion coefficient in a temperature range of 0 to 300° C. is preferably $70 \times 10^{-7}/°$ C. or less, more preferably $60 \times 10^{-7}/°$ C. or less, and further preferably $50 \times 10^{-7}/°$ C. or less.

Besides, for the water sterilization, there is used a light source where a UV-LED array being UV-LEDs arranged linearly are attached between a plurality of glass plates. The glass of the present invention formed into a plate shape is used as each glass plate, and thereby, it is possible to provide the plate-shaped UV-LED array with high deep ultraviolet light transmittance and high sterilizing property.

For example, a glass tube where an ultraviolet light source is attached therein is used as a light-emission tube of ultraviolet light. The glass of the present invention formed into the tubular shape is used as the glass tube, and thereby, it is possible to provide the light-emission tube having high deep ultraviolet light transmittance.

For example, in a manufacturing process of a semiconductor wafer, a support substrate is used for a back grind use or the like of silicon (Si). A silicon substrate is made further thinner by using the support substrate to contribute to a demand for reduction in size and thickness of a chip in cellular phones, digital AV devices, IC cards, and so on. Currently, a reclaimed Si substrate is often employed as the support substrate used for the back grind use of the semiconductor wafer, but there are problems such that a process time becomes long and yield is bad because a peeling method after the back grind is limited to a heat treatment and a physical process.

The UV high-transmitting glass of the present invention capable of controlling the thermal expansion coefficient is used as the support substrate, and thereby, the above-described problems can be solved. That is, a glass substrate whose thermal expansion coefficient is suited to silicon is used as the support substrate, and a back grind process is performed after the support substrate is adhered to a silicon substrate with an ultraviolet curable resin (a compound having an ultraviolet absorbing structure) or the like. After the back grind, it is exposed to high-intensity ultraviolet light to lower adhesiveness of the ultraviolet curable resin, and thereby, easy and rapid peeling off of the support substrate is enabled. In addition, the process time becomes short to contribute to improvement in yield.

Further, the ultraviolet transmitting glass of the present invention can be suitably used for a cell incubation container and a member to observe and measure cells (an instrument for organism analysis). In a cell incubation field, there is used a method where fluorescence protein is expressed in a desired cell or fluorescent dye is introduced to a desired cell and the fluorescence is observed, as a method to observe the cell. In the ultraviolet transmitting glass of the present invention, the fluorescence emitted from the glass in itself is small, and the fluorescence emitted from the glass when it is used as the container or the member is also small. It is therefore possible to measure weak fluorescence emitted from the cell with high accuracy. As the container and the member as stated above, there can be cited a cover glass, a slide glass, a dish for cell incubation, a well plate, a micro plate, a cell incubation container, an analysis chip (a biochip, a microchemical chip), a microchannel device, and so on, but it is not limited thereto.

EXAMPLES

Hereinafter, the present invention is described based on examples. Example 1 to Example 22 and Example 24 to Example 41 are examples of the present invention, and Example 23 is a comparative example. Samples used for respective examples were prepared as described below.

First, glass raw materials were compounded to produce glass compositions listed in Table 1 to Table 4, and melting, stirring, and clarifying were performed for this glass raw material formulation with an electric furnace using platinum crucible and setting molybdenum silicide as a heating element at a temperature of 1300 to 1650° C. for five hours. This molten substance was slip cast into a cast iron mold, and slowly cooled to obtain a glass sample (a glass block) of 800 g. Besides, slicing, polishing, and so on were performed for this glass block to obtain a glass plate with a predetermined shape (25 mm×25 mm×0.5 mm).

Respective measurements were carried out for the obtained glass block and glass plate regarding the transmittance of light with the wavelength of 254 nm at the plate thickness of 0.5 mm ("Transmittance at 254 nm" in Table 1 to Table 4), the transmittance of light with the wavelength of 365 nm at the plate thickness of 0.5 mm ("Transmittance at 365 nm" in Table 1 to Table 4), the degree of deterioration of the transmittance at each of the wavelength of 254 nm and the wavelength of 365 nm in the ultraviolet irradiation test, and the average thermal expansion coefficient in the temperature range of 0 to 300° C. These results are illustrated in the following fields in Table 1 to Table 4. Note that "-" in the measurement result indicates that it is not measured. In Table 1 to Table 4, "Ex" means Example.

TABLE 1

| Glass composition (mol %) | Ex 1 | Ex 2 | Ex 3 | Ex 4 | Ex 5 | Ex 6 |
|---|---|---|---|---|---|---|
| $SiO_2$ | 73.00 | 70.50 | 71.94 | 71.94 | 71.72 | 69.90 |
| $Al_2O_3$ | 1.50 | 1.70 | 1.73 | 1.73 | 0.00 | 1.73 |
| $Fe_2O_3$ | 0.001 | 0.001 | 0.001 | 0.001 | 0.001 | 0.001 |
| $TiO_2$ | 0.0005 | 0.0005 | 0.0004 | 0.0004 | 0.0005 | 0.0004 |
| $Li_2O$ | 0.00 | 0.00 | 0.00 | 0.00 | 0.00 | 0.00 |
| $Na_2O$ | 5.50 | 7.60 | 7.76 | 5.71 | 7.73 | 7.76 |
| $K_2O$ | 0.00 | 0.00 | 0.00 | 0.00 | 0.00 | 0.00 |
| $B_2O_3$ | 19.50 | 20.00 | 18.37 | 20.41 | 20.35 | 20.41 |
| CaO | 0.00 | 0.00 | 0.00 | 0.00 | 0.00 | 0.00 |
| MgO | 0.00 | 0.00 | 0.00 | 0.00 | 0.00 | 0.00 |
| ZnO | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00- | 0.00 | 0.00 |
| Cl | 0.50 | 0.00 | 0.00 | 0.00 | 0.00 | 0.00 |
| $SO_3$ | 0.00 | 0.20 | 0.20 | 0.20 | 0.20 | 0.20 |
| Total | 100 | 100 | 100 | 100 | 100 | 100 |
| Transmittance[%] at 254 nm Before ultraviolet irradiation | 77.33 | 75.04 | 72.67 | 76.00 | 87.40 | 77.62 |
| Transmittance[%] at 254 nm After ultraviolet irradiation | 78.38 | 74.21 | 72.80 | 75.75 | 82.57 | 77.54 |
| Degree of deterioration at wavelength of 254 nm[%] | −1.35 | 1.10 | −0.18 | 0.33 | 5.53 | 0.10 |
| Transmittance[%] at 365 nm Before ultraviolet irradiation | 93.69 | 91.78 | 91.54 | 92.30 | 94.43 | 91.68 |
| Transmittance[%] at 365 nm After ultraviolet irradiation | 86.87 | 89.28 | 89.29 | 91.33 | 92.65 | 90.11 |
| Degree of deterioration at wavelength of 365 nm[%] | 7.29 | 2.72 | 2.47 | 1.05 | 1.89 | 1.72 |
| Average thermal expansion coefficient at 0 to 300° C. [×$10^{-7}$/° C.] | 40.3 | 48.2 | 49.6 | 42.5 | 46.9 | 49.0 |

| Glass composition (mol %) | Ex 7 | Ex 8 | Ex 9 | Ex 10 | Ex 11 | Ex 12 |
|---|---|---|---|---|---|---|
| $SiO_2$ | 70.29 | 70.50 | 69.12 | 69.12 | 66.50 | 64.08 |
| $Al_2O_3$ | 1.69 | 0.00 | 1.67 | 1.67 | 1.70 | 1.55 |
| $Fe_2O_3$ | 0.001 | 0.001 | 0.001 | 0.001 | 0.001 | 0.001 |
| $TiO_2$ | 0.0004 | 0.0004 | 0.0006 | 0.0006 | 0.0005 | 0.0005 |
| $Li_2O$ | 0.00 | 0.00 | 0.00 | 0.00 | 0.00 | 0.00 |
| $Na_2O$ | 7.58 | 9.30 | 7.45 | 7.45 | 11.60 | 12.23 |
| $K_2O$ | 0.00 | 0.00 | 0.00 | 0.00 | 0.00 | 0.00 |
| $B_2O_3$ | 19.94 | 20.00 | 19.61 | 19.61 | 20.00 | 21.94 |
| CaO | 0.00 | 0.00 | 0.00 | 1.96 | 0.00 | 0.00 |
| MgO | 0.00 | 0.00 | 1.96 | 0.00 | 0.00 | 0.00 |

TABLE 1-continued

|  |  |  |  |  |  |  |
|---|---|---|---|---|---|---|
| ZnO | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| Cl | 0.50 | 0.00 | 0.00 | 0.00 | 0.00 | 0.00 |
| $SO_3$ | 0.00 | 0.20 | 0.20 | 0.20 | 0.20 | 0.20 |
| Total | 100 | 100 | 100 | 100 | 100 | 100 |
| Transmittance[%] at 254 nm Before ultraviolet irradiation | 76.9 | 86.6 | 71.2 | 76.9 | 76.2 | 76.5 |
| Transmittance[%] at 254 nm After ultraviolet irradiation | 76.4 | 81.9 | 71.0 | 75.6 | 73.9 | 71.9 |
| Degree of deterioration at wavelength of 254 nm[%] | 0.65 | 5.49 | 0.31 | 1.67 | 2.95 | 5.96 |
| Transmittance[%] at 365 nm Before ultraviolet irradiation | 92.14 | 91.4 | 91.3 | 91.2 | 91.0 | 91.9 |
| Transmittance[%] at 365 nm After ultraviolet irradiation | 83.30 | 88.5 | 89.0 | 89.0 | 87.0 | 86.8 |
| Degree of deterioration at wavelength of 365 nm[%] | 9.60 | 3.20 | 2.57 | 2.47 | 4.42 | 5.55 |
| Average thermal expansion coefficient at 0 to 300° C. [×$10^{-7}$/° C.] | — | — | 49.1 | 50.3 | 62.9 | 64.7 |

TABLE 2

| Glass composition (mol %) | Ex 13 | Ex 14 | Ex 15 | Ex 16 | Ex 17 | Ex 18 | Ex 19 | Ex 20 | Ex 21 | Ex 22 | Ex 23 |
|---|---|---|---|---|---|---|---|---|---|---|---|
| $SiO_2$ | 70.29 | 69.12 | 65.08 | 70.63 | 72.64 | 66.63 | 66.63 | 69.12 | 64.76 | 64.43 | 69.12 |
| $Al_2O_3$ | 0.00 | 1.67 | 0.00 | 1.70 | 1.71 | 0.70 | 0.20 | 1.67 | 0.00 | 0.00 | 3.63 |
| $Fe_2O_3$ | 0.001 | 0.001 | 0.001 | 0.001 | 0.001 | 0.001 | 0.001 | 0.001 | 0.001 | 0.001 | 0.001 |
| $TiO_2$ | 0.0004 | 0.0004 | 0.0004 | 0.0005 | 0.0006 | 0.0005 | 0.0005 | 0.0005 | 0.0004 | 0.0006 | 0.0004 |
| $Li_2O$ | 0.00 | 0.00 | 0.00 | 0.00 | 1.78 | 0.00 | 0.00 | 0.00 | 0.00 | 0.00 | 0.00 |
| $Na_2O$ | 7.58 | 7.45 | 12.43 | 7.61 | 1.42 | 11.62 | 11.62 | 7.45 | 12.36 | 12.30 | 7.45 |
| $K_2O$ | 0.00 | 0.00 | 0.00 | 0.00 | 5.42 | 0.00 | 0.00 | 0.00 | 0.00 | 0.00 | 0.00 |
| $B_2O_3$ | 19.94 | 19.61 | 22.29 | 20.04 | 17.02 | 20.04 | 20.04 | 19.61 | 22.17 | 22.06 | 19.61 |
| CaO | 0.00 | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 1.96 | 0.00 | 0.00 | 0.00 |
| $ZrO_2$ | 1.99 | 1.96 | 0.00 | 0.00 | 0.00 | 1.00 | 1.50 | 0.00 | 0.51 | 1.01 | 0.00 |
| SnO2 | 0.00 | 0.00 | 0.00 | 0.01 | 0.01 | 0.00 | 0.00 | 0.00 | 0.00 | 0.00 | 0.00 |
| Cl | 0.00 | 0.00 | 0.00 | 0.00 | 0.00 | 0.00 | 0.00 | 0.00 | 0.00 | 0.00 | 0.00 |
| $SO_3$ | 0.20 | 020 | 0.20 | 0.00 | 0.00 | 0.00 | 0.00 | 0.20 | 0.20 | 0.20 | 0.20 |
| Total | 100 | 100 | 100 | 100 | 100 | 100 | 100 | 100 | 100 | 100 | 100 |
| Transmittance[%] at 254 nm Before ultraviolet irradiation | 82.6 | 74.6 | 80.15 | 75.5 | 77.8 | 79.4 | 81.7 | 76.6 | 82.5 | 82.15 | 68.37 |
| Transmittance[%] at 254 nm After ultraviolet irradiation | 81.4 | 74.3 | 75.40 | 76.2 | 76.2 | 75.4 | 77.6 | 75.0 | 77.8 | 77.96 | — |
| Degree of deterioration at wavelength of 254 nm[%] | 1.47 | 0.48 | 5.92 | −0.91 | 2.06 | 5.03 | 4.97 | 2.02 | 5.77 | 5.10 | — |
| Transmittance[%] at 365 mn Before ultraviolet irradiation | 92.7 | 91.9 | 91.65 | 92.2 | 91.8 | 91.8 | 91.1 | 92.45 | 91.25 | 91.36 | — |
| Transmittance[%] at 365 nm After ultraviolet irradiation | 91.3 | 91.1 | 86.33 | 90.5 | 89.6 | 86.9 | 87.1 | 91.20 | 87.45 | 87.22 | — |
| Degree of deterioration at wavelength of 365 nm[%] | 1.50 | 0.88 | 5.80 | 1.93 | 2.47 | 5.38 | 4.42 | 1.36 | 4.16 | 4.53 | — |
| Average thermal expansion coefficient at 0 to 300° C. [×$10^{-7}$/° C.] | 44.5 | 46.9 | 62.8 | — | 52.2 | 62.1 | 61.4 | 47.5 | 62.0 | 61.0 | — |

TABLE 3

| Glass composition (mol %) | Ex 24 | Ex 25 | Ex 26 | Ex 27 | Ex 28 | Ex 29 | Ex 30 | Ex 31 | Ex 32 |
|---|---|---|---|---|---|---|---|---|---|
| $SiO_2$ | 64.65 | 64.00 | 66.67 | 63.43 | 63.17 | 61.59 | 63.40 | 62.81 | 62.19 |
| $Al_2O_3$ | 0.00 | 0.00 | 0.00 | 0.00 | 0.00 | 0.00 | 0.00 | 0.00 | 0.00 |
| $Fe_2O_3$ | 0.001 | 0.001 | 0.001 | 0.001 | 0.001 | 0.001 | 0.001 | 0.001 | 0.001 |
| $Ti_2O$ | 0.0004 | 0.0004 | 0.0004 | 0.0005 | 0.0006 | 0.0005 | 0.0005 | 0.0005 | 0.0004 |
| $Li_2O$ | 0.00 | 0.00 | 0.00 | 0.00 | 0.73 | 0.48 | 0.00 | 0.00 | 0.00 |
| $Na_2O$ | 11.99 | 11.87 | 12.37 | 12.11 | 12.06 | 11.76 | 12.10 | 11.99 | 11.87 |
| $K_2O$ | 0.00 | 0.00 | 0.00 | 0.57 | 0.24 | 1.07 | 0.12 | 0.56 | 0.56 |
| $B_2O_3$ | 22.14 | 21.92 | 18.67 | 21.72 | 21.63 | 21.09 | 21.71 | 21.51 | 21.30 |
| CaO | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 |
| ZnO | 1.01 | 0.00 | 0.00 | 0.00 | 0.00 | 0.00 | 1.96 | 0.00 | 0.00 |
| $ZrO_2$ | 0.00 | 2.00 | 2.08 | 1.96 | 1.96 | 3.81 | 0.49 | 2.93 | 3.88 |
| $Ta_2O_5$ | 0.00 | 0.00 | 0.00 | 0.00 | 0.00 | 0.00 | 0.00 | 0.00 | 0.00 |
| $SnO_2$ | 0.01 | 0.01 | 0.01 | 0.01 | 0.01 | 0.01 | 0.01 | 0.01 | 0.01 |
| Cl | 0.00 | 0.00 | 0.00 | 0.00 | 0.00 | 0.00 | 0.00 | 0.00 | 0.00 |
| $SO_3$ | 0.20 | 0.20 | 0.21 | 0.20 | 0.20 | 0.19 | 0.20 | 0.19 | 0.19 |
| Total | 100 | 100 | 100 | 100 | 100 | 100 | 100 | 100 | 100 |
| Transmittance[%] at 254 nm Before ultraviolet irradiation | 83.72 | 78.12 | 79.82 | 84.44 | 83.13 | 83.06 | 85.33 | 82.04 | 81.86 |
| Transmittance[%] at 254 nm After ultraviolet irradiation | 78.26 | 73.51 | 76.43 | 80.96 | 80.11 | 80.27 | 81.93 | 80.29 | 80.30 |
| Degree of deterioration at wavelength of 254 nm[%] | 6.51 | 5.90 | 4.25 | 4.11 | 3.64 | 3.35 | 3.98 | 2.13 | 1.90 |
| Transmittance[%] at 365 nm Before ultraviolet irradiation | 91.73 | 90.94 | 91.08 | 91.29 | 90.91 | 90.72 | 91.36 | 91.18 | 90.66 |
| Transmittance[%] at 365 nm After ultraviolet irradiation | 88.68 | 88.22 | 87.73 | 88.27 | 88.16 | 88.18 | 88.96 | 89.04 | 89.03 |
| Degree of deterioration at wavelength of 365 nm[%] | 3.33 | 2.99 | 3.68 | 3.31 | 3.02 | 2.80 | 2.63 | 2.34 | 1.79 |
| Average thermal expansion coefficient at 0 to 300° C. [$\times 10^{-7}$/° C.] | 64.4 | 62.3 | 642 | 67.8 | 68.0 | 68.8 | 67.5 | 67.2 | 66.2 |

TABLE 4

| Glass composition (mol %) | Ex 33 | Ex 34 | Ex 35 | Ex 36 | Ex 37 | Ex 38 | Ex 39 | Ex 40 | Ex 41 |
|---|---|---|---|---|---|---|---|---|---|
| SiO2 | 61.59 | 60.99 | 61.29 | 61.59 | 59.54 | 61.29 | 62.88 | 65.01 | 73.64 |
| Al2O3 | 0.00 | 0.00 | 0.00 | 0.00 | 0.00 | 0.00 | 0.00 | 0.00 | 1.71 |
| Fe2O3 | 0.001 | 0.001 | 0.001 | 0.001 | 0.001 | 0.001 | 0.001 | 0.001 | 0.001 |
| Ti2O | 0.0006 | 0.0004 | 0.0005 | 0.0006 | 0.0005 | 0.0006 | 0.0005 | 0.0006 | 0.0006 |
| Li2O | 0.00 | 0.00 | 0.00 | 0.00 | 0.00 | 0.47 | 0.00 | 0.00 | 1.78 |
| Na2O | 11.76 | 11.64 | 11.22 | 10.79 | 10.43 | 11.70 | 10.36 | 12.41 | 0.42 |
| K2O | 0.55 | 0.55 | 0.55 | 0.55 | 0.53 | 1.06 | 0.53 | 0.00 | 5.42 |
| B2O3 | 21.09 | 20.89 | 20.99 | 21.09 | 20.39 | 20.99 | 20.25 | 22.26 | 17.02 |
| CaO | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 |
| ZrO2 | 4.82 | 5.73 | 5.76 | 5.79 | 8.92 | 3.79 | 5.56 | 0.00 | 0.00 |
| Ta2O5 | 0.00 | 0.00 | 0.00 | 0.00 | 0.00 | 0.50 | 0.23 | 0.10 | 0.00 |
| SnO2 | 0.01 | 0.01 | 0.01 | 0.01 | 0.01 | 0.01 | 0.01 | 0.01 | 0.01 |
| Cl | 0.00 | 0.00 | 0.00 | 0.00 | 0.00 | 0.00 | 0.00 | 0.00 | 0.00 |
| SO3 | 0.19 | 0.19 | 0.19 | 0.19 | 0.18 | 0.19 | 0.18 | 0.20 | 0.00 |
| Total | 100 | 100 | 100 | 100 | 100 | 100 | 100 | 100 | 100 |
| Transmittance[%] at 254 nm Before ultraviolet irradiation | 82.29 | 82.40 | 82.86 | 82.61 | 81.25 | 76.29 | 79.45 | 81.41 | 83.15 |
| Transmittance[%] at 254 nm After ultraviolet irradiation | 80.89 | 81.23 | 81.52 | 81.62 | 80.71 | 76.71 | 79.27 | 80.67 | 81.08 |
| Degree of deterioration at wavelength of 254 nm[%] | 1.71 | 1.41 | 1.62 | 1.20 | 0.67 | −0.56 | 0.23 | 0.91 | 2.49 |
| Transmittance[%] at 365 nm Before ultraviolet irradiation | 90.83 | 91.05 | 91.06 | 91.05 | 90.67 | 91.13 | 91.03 | 91.41 | 91.74 |
| Transmittance[%] at 365 nm After ultraviolet irradiation | 89.22 | 89.32 | 89.03 | 89.37 | 89.82 | 90.45 | 90.85 | 90.69 | 90.77 |
| Degree of deterioration at wavelength of 365 nm[%] | 1.78 | 1.90 | 2.23 | 1.84 | 0.94 | 0.75 | 0.20 | 0.79 | 1.06 |
| Average thermal expansion coefficient at 0 to 300° C. [$\times 10^{-7}$/° C.] | 65.6 | 64.8 | 63.2 | 61.9 | 59.6 | 67.2 | 60.1 | 62.8 | 51.3 |

The transmittance of the glass was measured with an ultraviolet visible near infrared spectrophotometer (manufactured by JASCO Corporation, model number: V-570).

Regarding the degree of deterioration of the transmittance in the ultraviolet irradiation test, transmittance of each of light with the wavelength of 254 nm and light with the wavelength of 365 nm was measured with the ultraviolet visible near infrared spectrophotometer (manufactured by JASCO Corporation, model number: V-570) as for the glass having a predetermined shape (25 mm×25 mm×0.5 mm) which was optically polished on both surfaces to have the thickness of 0.5 mm. Next, ultraviolet light was irradiated by using the physicochemical high-pressure mercury lamp (manufactured by Toshiba Corporation, model number: H-400P) under a condition of an ultraviolet irradiation intensity at the wavelength of 254 nm of about 5 mW/cm$^2$ for 100 hours, and thereafter, the transmittance of the glass was measured again. A change in the transmittance before and after the ultraviolet irradiation at each of the wavelength of 254 nm and the wavelength of 365 nm were compared. It was judged to be "changed" when the degree of deterioration (%) (=[(the transmittance before the ultraviolet irradiation−the transmittance after the ultraviolet irradiation)/the transmittance before the ultraviolet irradiation]×100) at each wavelength was 10% or more, and it was judged to be "not changed" when the degree of deterioration is less than 10%. The glasses of Example 1 to Example 22 and Example 24 to Example 41 being the examples each have little change in the transmittance before and after the ultraviolet irradiation.

Regarding the thermal expansion coefficient, a difference in elongations of the glass at 0° C. and 300° C. was measured, and an average linear expansion coefficient from 0 to 300° C. was calculated based on the change amount of these lengths. Concrete measurement methods are as described below. A measurement object glass is processed into a glass bar having a circular cross section (length: 100 mm, outer diameter: 4 to 6 mm). Next, the glass is held by a quartz holder, it is retained at 0° C. for 30 minutes, and then the length is measured with a micro-gauge. Next, the glass is put into an electric furnace at 300° C., it is retained for 30 minutes, and then the length is measured with the micro-gauge. The thermal expansion coefficient is calculated from a difference in measured elongations of the glass at 0° C. and 300° C. Note that measurement of a thermal expansion coefficient using a difference in elongations at 0° C. and 300° C. is also performed similarly for a platinum bar (length: 100 mm, outer diameter: 4.5 mm, thermal expansion coefficient: 92.6×10$^{-7}$/° C.), and when the thermal expansion coefficient of the platinum bar deviates from 92.6×10$^{-7}$/° C., the measurement result of the thermal expansion coefficient of the glass is corrected by using the deviated amount.

In each of the glasses of Example 1 to Example 22 and Example 24 to Example 41, the transmittance at the wavelength of 254 nm at the plate thickness of 0.5 mm was 70% or more, the transmittance at the wavelength of 356 nm at the plate thickness of 0.5 mm was 80% or more, and it was clear that the high ultraviolet transmittance was held. On the other hand, in the glass of Example 23, the transmittance at the wavelength of 254 nm at the plate thickness of 0.5 mm was less than 70%, and the ultraviolet transmittance was low.

Next, average reflectance of a glass inside and average reflectance of a glass surface with respect to light with wavelengths from 250 to 1200 nm were compared regarding the glasses of the examples. Concretely, compositions at the glass surfaces of the glasses of Example 2 and Example 5 were analyzed with a fluorescent X-ray analysis (XRF device (manufactured by Rigaku Corporation, device name: ZSX Primus 2)). Next, the glass was cut at a center, and a composition at a center part in a plate thickness direction (inside) was analyzed by a wet analysis method. Analyzation results of the compositions at the glass surface and the inside are illustrated in Table 5. Besides, a refractive index of the glass inside was measured, and reflectance calculated therefrom was found. Besides, actually measured reflectance at each wavelength of the glass of Example 5 was found. These results are illustrated in Table 6. In Table 6, and represents a refractive index of a d line (a wavelength of 587.6 nm), nC represents a refractive index of a C line (a wavelength of 656.3 nm), and nF represents a refractive index of an F line (a wavelength of 486.1 nm), respectively.

TABLE 5

|  | Example 5 | | Example 2 | |
| --- | --- | --- | --- | --- |
| mass % | Glass inside | Glass surface | Glass inside | Glass surface |
| SiO$_2$ | 70.2 | 83.4 | 67.4 | 65.8 |
| Al$_2$O$_3$ | 0 | 0 | 2.76 | 2.98 |
| Fe$_2$O$_3$ | 3 ppm | 0.007 | 0.003 | 0.009 |
| Na$_2$O | 7.78 | 6.95 | 7.49 | 8.44 |
| B$_2$O$_3$ | 22.1 | 9.6 | 22.1 | 22.7 |
| SO$_3$ | 30 ppm | 0.01 | 0.25 | 0.009 |

TABLE 6

|  | Refractive index | Wavelength (nm) | (1) Reflectance (%) Calculated value from refractive indexes of both surfaces | (2) Reflectance (%) Actual measured value of both surfaces | Difference in reflectance (%) (1) − (2) |
| --- | --- | --- | --- | --- | --- |
| nd | 1.4839 | 587.6 | 7.59 | 3.62 | 3.97 |
| nC | 1.4816 | 656.3 | 7.53 | 3.73 | 3.80 |
| nF | 1.4890 | 486.1 | 7.72 | 3.97 | 3.75 |

Figure 1:
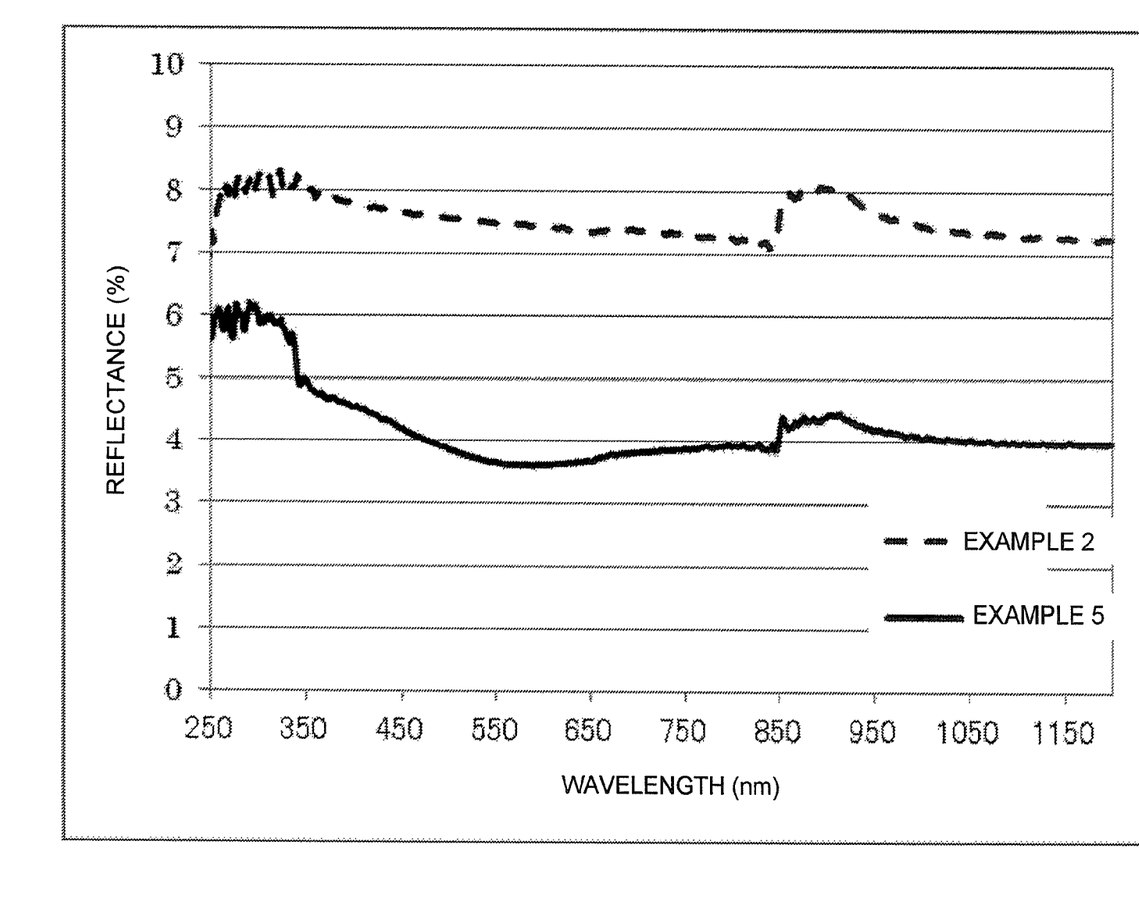
FIG. 1 is a graphic chart illustrating reflectance (actual measured value) of light with wavelengths from 250 nm to 1200 nm at a glass surface in each of a glass of Example 5 and a glass of Example 2.

As illustrated in Table 6, the reflectance of the glass surface shown by the actual measured value is lower compared to the reflectance calculated from the refractive index of the glass inside regarding the glass of Example 5. Accordingly, the transmittance at the wavelength of 254 nm is extremely high to be over 85% as illustrated in Table 1. This is because the SiO$_2$ content of the glass surface is higher than that of the glass inside, and the B$_2$O$_3$ content of the glass surface is lower than that of the glass inside as illustrated in Table 5, and therefore, it is thought that the glass surface becomes a low-refractive index layer, and the average reflectance of light with the wavelengths from 250 nm to 1200 nm becomes low. The reflectance (actual measured value) at the glass surface of the light with the wavelengths from 250 nm to 1200 nm of each of the glass of Example 5 and the glass of Example 2 is illustrated in FIG. 1. In the glass of Example 2, the glass surface is not the low-refractive index layer, and therefore, the reflectance is higher than the glass of Example 5. Note that the transmittance at the wavelength of 254 nm of the glass of Example 8 is extremely high to be over 85%, and it is considered that the glass surface becomes the low-refractive index layer as same as the glass of Example 5.

Next, it was verified regarding the glasses of the examples whether an adhesion state between the glass and a joint member can be kept even when a temperature change occurs. As illustrated in Table 7, each of the glasses of the examples and the comparative example was adhered to a joint member having a predetermined thermal expansion coefficient (an average linear expansion coefficient in a temperature range of 0 to 300° C.) by using a glass flit. Next, the glass was input to an electric furnace at 500° C. under a state where the glass and the joint member were adhered, then it was taken out of the electric furnace after it was heated for 30 minutes, then it was rapidly cooled in a room temperature atmosphere. The adhesion state between the glass and the joint member was examined, and presence/absence of cracks of the glass was checked. The glass with the cracks was evaluated as "×", and the glass without the cracks was evaluated as "○". In Table 7, "LTCC" is Low Temperature Co-fired Ceramics.

less, the cracks of the glass did not occur in case when the temperature change occurred on both of them.

Next, fluorescent characteristics of the glasses of the examples (Example 15, Example 29 and Example 41) and the comparative example were measured and evaluated. As the comparative example, D263M (brand name) manufactured by Schott Corporation was used.

The measurement was carried out as follows. That is, a microscopic Raman spectrometer was used, excitation light with the wavelength of 532 nm was irradiated on a sample, and fluorescence emitted from the sample was received by a spectroscope through an optical filter which removes reflection of the excitation light and scattered light. Then a relationship between fluorescence intensity and a wavelength was measured. Note that the spectroscope was disposed in a direction perpendicular to the excitation light so as not to directly receive the excitation light which transmits through the sample. A maximum value of the fluorescence intensity at wavelengths from 600 to 800 nm was set as an index of the fluorescent characteristics based on measurement data of the fluorescence intensity and the wavelength of each glass. Evaluation results of the fluorescent characteristics are illustrated in Table 8 together with the wavelength where each fluorescence intensity shows a maximum value at the wavelengths from 600 to 800 nm.

TABLE 7

|  | Example | Example | Comparative example | Comparative example |
|---|---|---|---|---|
| Kind of glass | Glass of Example 15 | Glass of Example 15 | Quartz glass | Soda lime glass |
| Average thermal expansion coefficient at temperature range of 0 to 300° C. of glass [×10$^{-7}$/° C.] | 62.8 | 62.8 | 5 | 85 |
| Kind of joint member | Borosilicate glass | LTCC | LTCC | Borosilicate glass |
| Average thermal expansion coefficient at temperature range of 0 to 300° C. of joint member [×10$^{-7}$/° C.] | 63 | 60 | 60 | 48 |
| Difference in average thermal expansion coefficients between glass and joint member [×10$^{-7}$/° C.] | 0.2 | 2.8 | 55 | 37 |
| Presence/absence of cracks of glass | ○ | ○ | × | × |

As illustrated in Table 7, when a difference in average thermal expansion coefficients between the glass and the joint member was large, the cracks of the glass occurred when the temperature change occurred on both of them. On the other hand, when the average thermal expansion coefficient of the glass was in the range of 30×10$^{-7}$ to 90×10$^{-7}$/° C., and the average thermal expansion coefficient difference between the glass and the joint member was 20×10$^{-7}$/° C. or

TABLE 8

|  | Example 15 | Example 29 | Example 41 | Comparative example (D263M) |
|---|---|---|---|---|
| Fluorescence intensity (a.u.) | 1.2 × 10$^2$ | 1.2 × 10$^2$ | 1.0 × 10$^2$ | 4.0 × 10$^2$ |
| Wavelength | 685 nm | 685 nm | 660 nm | 720 nm |

As it can be seen from Table 8, the fluorescence of each of the ultraviolet transmitting glasses of the examples was lower than that of the glass (D263M) of the comparative example. Accordingly, the ultraviolet transmitting glass of the present invention can be suitably used for a cell incubation container supplied for a fluorescence measurement and a member to observe and measure cells (organism analysis instruments).

According to the present invention, it is possible to obtain a glass having high ultraviolet light transmittance, in particular, high deep ultraviolet light transmittance.

What is claimed is:

1. An ultraviolet transmitting glass containing, in mole percentage based on oxides,
   55 to 80% of $SiO_2$,
   12 to 27% of $B_2O_3$,
   4 to 20% of $R_2O$ in total, where R represents at least one kind of an alkali metal selected from a group consisting of Li, Na, and K,
   0.0001 to 0.0006% of $TiO_2$,
   0 to 3.5% of $Al_2O_3$,
   0 to 5% of R'O in total, where R' represents at least one kind of an alkaline earth metal selected from a group consisting of Mg, Ca, Sr, and Ba,
   0 to 5% of ZnO, and
   0 to 10% of $ZrO_2$,
   wherein transmittance at a wavelength of 254 nm in terms of spectral transmittance at a plate thickness of 0.5 mm is 70% or more.

2. The ultraviolet transmitting glass according to claim 1, wherein 0.01 to 2% of $Ta_2O_5$ is contained.

3. The ultraviolet transmitting glass according to claim 1, wherein $Al_2O_3$ is not substantially contained.

4. The ultraviolet transmitting glass according to claim 1, wherein R'O, where R' represents the alkaline earth metal selected from the group consisting of Mg, Ca, Sr, and Ba, is not substantially contained.

5. The ultraviolet transmitting glass according to claim 1, wherein none of $Cr_2O_3$, NiO, CuO, $CeO_2$, $V_2O_5$, $WO_3$, $MnO_3$, $MnO_2$, and CoO is substantially contained.

6. The ultraviolet transmitting glass according to claim 1, wherein Cl is not substantially contained.

7. The ultraviolet transmitting glass according to claim 1, wherein a $SiO_2$ content of a surface is higher than that of an inside, and a $B_2O_3$ content of the surface is lower than that of the inside.

8. The ultraviolet transmitting glass according to claim 1, wherein average reflectance of a surface is lower than average reflectance of an inside for 3% or more in terms of average reflectance of light with wavelengths from 250 to 1200 nm.

9. The ultraviolet transmitting glass according to claim 1, wherein a degree of deterioration of transmittance at the wavelength of 254 nm which is found by the following expression is 10% or less in an ultraviolet irradiation test, Degree of deterioration (%)=$[(T0-T1)/T0] \times 100$ where T0 is initial transmittance at the wavelength of 254 nm of a glass substrate with a plate thickness of 0.5 mm whose both surfaces are optically polished, and T1 is transmittance at the wavelength of 254 nm after ultraviolet light with the wavelength of 254 nm is irradiated on the glass substrate at an intensity of 5 mW/cm² for 100 hours.

10. The ultraviolet transmitting glass according to claim 1, wherein transmittance at a wavelength of 365 nm is 80% or more in terms of spectral transmittance at a plate thickness of 0.5 mm.

11. The ultraviolet transmitting glass according to claim 1, wherein an average thermal expansion coefficient in a temperature range of 0 to 300° C. is $30 \times 10^{-7}$/° C. to $90 \times 10^{-7}$/° C.

12. An ultraviolet transmitting glass contains, in mole percentage based on oxides,
   55 to 80% of $SiO_2$,
   12 to 27% of $B_2O_3$,
   4 to 20% of $R_2O$ in total, where R represents at least one kind of an alkali metal selected from a group consisting of Li, Na, and K,
   0.0001 to 0.0006% of $TiO_2$,
   0 to 3.5% of $Al_2O_3$,
   0 to 5% of R'O in total, where R' represents at least one kind of an alkaline earth metal selected from a group consisting of Mg, Ca, Sr, and Ba,
   0 to 5% of ZnO, and
   0 to 5% of $Ta_2O_5$,
   wherein transmittance at a wavelength of 254 nm in terms of spectral transmittance at a plate thickness of 0.5 mm is 70% or more.

13. The ultraviolet transmitting glass according to claim 12, wherein 0.01 to 2% of $Ta_2O_5$ is contained.

14. The ultraviolet transmitting glass according to claim 12, wherein $Al_2O_3$ is not substantially contained.

15. The ultraviolet transmitting glass according to claim 12, wherein R'O, where R' represents the alkaline earth metal selected from the group consisting of Mg, Ca, Sr, and Ba, is not substantially contained.

16. The ultraviolet transmitting glass according to claim 12, wherein Cl is not substantially contained.

17. The ultraviolet transmitting glass according to claim 12, wherein average reflectance of a surface is lower than average reflectance of an inside for 3% or more in terms of average reflectance of light with wavelengths from 250 to 1200 nm.

18. The ultraviolet transmitting glass according to claim 12, wherein a $SiO_2$ content of a surface is higher than that of an inside, and a $B_2O_3$ content of the surface is lower than that of the inside.

* * * * *